US012222211B2

(12) United States Patent
Okubo et al.

(10) Patent No.: US 12,222,211 B2
(45) Date of Patent: Feb. 11, 2025

(54) INFORMATION PROCESSING APPARATUS, METHOD, AND NON-TRANSITORY STORAGE MEDIUM

(71) Applicant: TOYOTA JIDOSHA KABUSHIKI KAISHA, Toyota (JP)

(72) Inventors: Atsushi Okubo, Nisshin (JP); Kento Nitta, Tokyo (JP); Takaaki Kato, Saitama (JP); Daiki Kaneichi, Tokyo (JP); Minoru Nakadori, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 17/658,033

(22) Filed: Apr. 5, 2022

(65) Prior Publication Data
US 2022/0333941 A1 Oct. 20, 2022

(30) Foreign Application Priority Data

Apr. 15, 2021 (JP) ................. 2021-069301

(51) Int. Cl.
*G01C 21/34* (2006.01)
*G06Q 10/02* (2012.01)
*G07C 5/08* (2006.01)
*B60S 3/00* (2006.01)

(52) U.S. Cl.
CPC ......... *G01C 21/3476* (2013.01); *G06Q 10/02* (2013.01); *G07C 5/0808* (2013.01); *B60S 3/00* (2013.01)

(58) Field of Classification Search
CPC .... G01C 21/3476; G01C 21/3484; B60S 3/00
See application file for complete search history.

(56) References Cited

U.S. PATENT DOCUMENTS

| 6,356,822 | B1 | 3/2002 | Diaz et al. |
| 8,099,308 | B2 | 1/2012 | Uyeki |
| 9,053,588 | B1 | 6/2015 | Briggs et al. |
| 9,466,154 | B2 | 10/2016 | Akselrod et al. |
| 9,646,356 | B1 | 5/2017 | Schwie et al. |
| 9,665,992 | B2 | 5/2017 | Akselrod et al. |

(Continued)

FOREIGN PATENT DOCUMENTS

| CN | 109765895 A | 5/2019 |
| JP | 2003267554 A | 9/2003 |

(Continued)

OTHER PUBLICATIONS

Miyako Hayashida et al., Office Action Issued To U.S. Appl. No. 17/163,641 dated Mar. 27, 2023.

(Continued)

*Primary Examiner* — John Kwon
(74) *Attorney, Agent, or Firm* — Dickinson Wright, PLLC

(57) ABSTRACT

An information processing apparatus includes: a communication interface; and one or more processors configured to when determining that a degree of dirt of a vehicle exceeds a predetermined first threshold value, select at least one vehicle washing facility from among a plurality of vehicle washing facilities, based on an attribute of a user of the vehicle, and notify the user of guidance information for guiding the user to the selected vehicle washing facility via the communication interface.

11 Claims, 4 Drawing Sheets

(56) References Cited

U.S. PATENT DOCUMENTS

| | | |
|---|---|---|
| 9,805,519 B2 | 10/2017 | Ramanujam |
| 10,049,505 B1 | 8/2018 | Harvey et al. |
| 10,086,782 B1 | 10/2018 | Konrardy et al. |
| 10,268,192 B1 | 4/2019 | Wengreen et al. |
| 10,299,216 B1 | 5/2019 | Wengreen et al. |
| 10,466,057 B1 | 11/2019 | Schwie et al. |
| 11,060,876 B2 | 7/2021 | Akselrod et al. |
| 2004/0073468 A1 | 4/2004 | Vyas et al. |
| 2004/0143490 A1 | 7/2004 | Kelly et al. |
| 2005/0273218 A1 | 12/2005 | Breed et al. |
| 2006/0184295 A1* | 8/2006 | Hawkins ............... G07C 5/008 701/31.4 |
| 2008/0042802 A1 | 2/2008 | Shaffer et al. |
| 2009/0043441 A1 | 2/2009 | Breed |
| 2009/0254240 A1 | 10/2009 | Olsen, III et al. |
| 2010/0057511 A1 | 3/2010 | Mansouri et al. |
| 2011/0172873 A1 | 7/2011 | Szwabowski et al. |
| 2012/0277949 A1 | 11/2012 | Ghimire et al. |
| 2015/0057875 A1 | 2/2015 | McGinnis et al. |
| 2015/0348335 A1 | 12/2015 | Ramanujam |
| 2016/0148439 A1 | 5/2016 | Akselrod et al. |
| 2016/0359325 A1* | 12/2016 | Kawata ............... H04L 12/2829 |
| 2017/0147959 A1 | 5/2017 | Sweeney et al. |
| 2018/0074490 A1 | 3/2018 | Park |
| 2018/0130161 A1 | 5/2018 | Wengreen et al. |
| 2018/0345918 A1* | 12/2018 | Foerg ..................... G07F 17/20 |
| 2019/0156598 A1 | 5/2019 | Palmer, Jr. |
| 2019/0176845 A1 | 6/2019 | Yoon |
| 2019/0197798 A1 | 6/2019 | Abari et al. |
| 2019/0204097 A1 | 7/2019 | Starns |
| 2019/0220035 A1 | 7/2019 | Wengreen et al. |
| 2019/0250616 A1 | 8/2019 | Ramanujam |
| 2019/0378350 A1 | 12/2019 | DeRouen et al. |
| 2020/0103239 A1 | 4/2020 | Schwie et al. |
| 2020/0118185 A1* | 4/2020 | Kaneichi ............ G06Q 30/0609 |
| 2020/0406866 A1 | 12/2020 | Asai |
| 2021/0070304 A1 | 3/2021 | Weldemariam et al. |
| 2021/0081906 A1 | 3/2021 | Shimada et al. |
| 2021/0097779 A1 | 4/2021 | Kaneda et al. |
| 2021/0114626 A1 | 4/2021 | Hirose et al. |
| 2021/0158631 A1 | 5/2021 | Kwon |
| 2021/0241545 A1* | 8/2021 | Hayashida ............. G07C 5/006 |
| 2021/0272188 A1 | 9/2021 | Kobayashi |
| 2021/0334764 A1* | 10/2021 | Yamauchi .............. G06Q 50/10 |
| 2023/0249699 A1* | 8/2023 | Kobayashi ............. B60K 35/00 701/29.2 |
| 2023/0249700 A1* | 8/2023 | Kobayashi ........ B60W 50/0205 701/29.2 |
| 2023/0251099 A1* | 8/2023 | Kobayashi .......... B60W 60/001 701/25 |

FOREIGN PATENT DOCUMENTS

| | | |
|---|---|---|
| JP | 2007202051 A | 8/2007 |
| JP | 2015122107 A | 7/2015 |
| JP | 2019109165 A | 7/2019 |
| JP | 6560814 B1 | 8/2019 |
| JP | 2019219842 A | 12/2019 |
| JP | 2019220056 A | 12/2019 |
| JP | 2020013374 A | 1/2020 |
| JP | 2020027522 A | 2/2020 |
| JP | 2020095375 A | 6/2020 |
| JP | 2021005332 A | 1/2021 |
| JP | 2021047606 A | 3/2021 |
| KR | 101767187 B1 | 8/2017 |
| WO | 2019/163194 A1 | 8/2019 |

OTHER PUBLICATIONS

Miyako Hayashida et al., Office Action Issued To U.S. Appl. No. 17/163,641 dated Sep. 29, 2023.

Miyako Hayashida, Office Action Issued to U.S. Appl. No. 17/163,641 on Jan. 29, 2024.

Miyako Hayashida et al., U.S. Appl. No. 17/163,641, Office Action dated Jun. 5, 2024

Miyako Hayashida et al., Notice o Allowance Issued to U.S. Appl. No. 17/163,641 On Sep. 16, 2024.

* cited by examiner

INFORMATION PROCESSING APPARATUS, METHOD, AND NON-TRANSITORY STORAGE MEDIUM

CROSS-REFERENCE TO RELATED APPLICATION

This application claims priority to Japanese Patent Application No. 2021-069301 filed on Apr. 15, 2021, incorporated herein by reference in its entirety.

BACKGROUND

1. Technical Field

The present disclosure relates to an information processing apparatus, a method, and a non-transitory storage medium.

2. Description of Related Art

As a technology for proposing vehicle washing, for example, Japanese Unexamined Patent Application Publication No. 2019-219842 discloses a technology for sending a notification of an appropriate vehicle cleaning time, or for executing cleaning.

SUMMARY

There is room for improvement in the technology that proposes vehicle washing.

The present disclosure improves a technology for proposing vehicle washing.

An information processing apparatus according to a first aspect of the present disclosure includes a communication interface and one or more processors. The one or more processors are configured to when determining that a degree of dirt of a vehicle exceeds a predetermined first threshold value, select at least one vehicle washing facility, from among a plurality of vehicle washing facilities, based on an attribute of a user of the vehicle, and notify the user of guidance information for guiding the user to the selected vehicle washing facility via the communication interface.

A method according to a second aspect of the present disclosure is executed by an information processing apparatus. The method includes when determining that a degree of dirt of a vehicle exceeds a predetermined first threshold value, selecting at least one vehicle washing facility, from among a plurality of vehicle washing facilities, based on an attribute of a user of the vehicle, and notifying the user of guidance information for guiding the user to the selected vehicle washing facility.

A third aspect of the present disclosure is a non-transitory storage medium storing instructions that are executable by one or more processors and that cause the one or more processors to perform functions. The functions include selecting, when determining that a degree of dirt of a vehicle exceeds a predetermined first threshold value, selecting at least one vehicle washing facility, from among a plurality of vehicle washing facilities, based on an attribute of a user of the vehicle, and notifying the user of guidance information for guiding the user to the selected vehicle washing facility.

With each aspect of the present disclosure, a technology for proposing vehicle washing is improved.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Hereinafter, embodiments of the present disclosure will be described.

Overview of Embodiments

Figure 1:
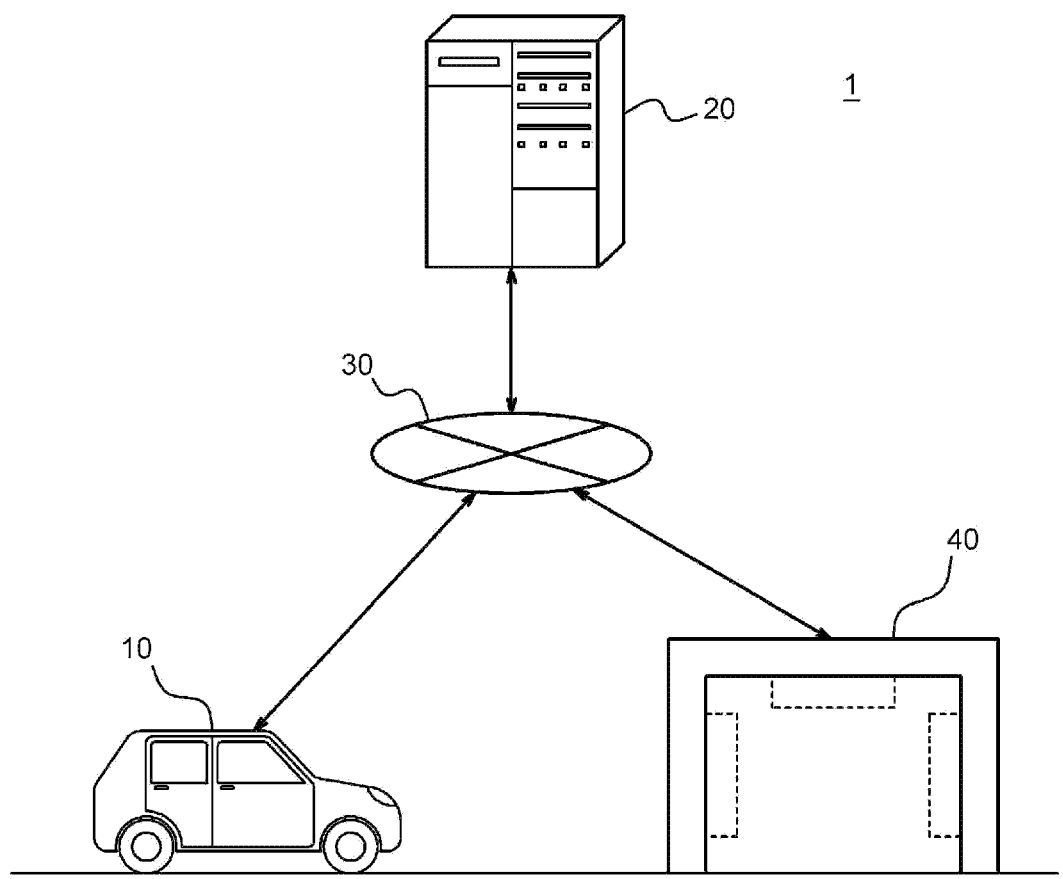
FIG. 1 is a block diagram illustrating a schematic configuration of a system according to one embodiment of the present disclosure.

An overview of a system 1 according to an embodiment of the present disclosure will be described with reference to FIG. 1. The system 1 includes a vehicle 10 and an information processing apparatus 20. The vehicle 10 and the information processing apparatus 20 are communicably connected to a network 30 including, for example, the Internet and a mobile communication network.

Examples of the vehicle 10 include, but are not limited to, an automobile, and may include any vehicle. Examples of the automobile include, but are not limited to, a gasoline-powered vehicle, a battery electric vehicle (BEV), a hybrid electric vehicle (HEV), a plug-in hybrid electric vehicle (PHEV), or a fuel-cell electric vehicle (FCEV). The vehicle 10 may be driven by a driver or may be driven at any level of automation. The level of automation may be, for example, one of Level 1 to Level 5 classified by the Society of Automotive Engineers (SAE). The vehicle 10 may be a vehicle dedicated to Mobility-as-a-Service (MaaS). The number of vehicles 10 included in the system 1 may be arbitrarily determined.

The information processing apparatus 20 is a computer, such as a server apparatus. The information processing apparatus 20 can communicate with the vehicle 10 via the network 30.

First, the overview of the present embodiment will be described, and then details will be described below. Upon determining that a dirtiness degree of the vehicle 10 (a degree of a dirt of the vehicle 10) exceeds a predetermined first threshold value, a control unit 21 of the information processing apparatus 20 selects at least one vehicle washing facility 40 based on an attribute of a user of the vehicle 10 from among a plurality of vehicle washing facilities 40. Then, the control unit 21 of the information processing apparatus 20 notifies the user of the vehicle 10 of guidance information for guiding the user of the vehicle 10 to the selected vehicle washing facility 40 via the communication unit 22.

As such, with the present embodiment, the guidance information to the vehicle washing facility 40, which is selected based on the attribute of the user of the vehicle 10, is notified to the user of the vehicle 10. For example, the guidance information to the vehicle washing facility 40, which is selected based on the preference of the user of the vehicle 10, is notified to the user of the vehicle 10 at an appropriate timing. For this reason, the user of the vehicle 10 can keep the vehicle 10 in a clean state without executing unnecessary vehicle washing. Therefore, the technology for proposing vehicle washing is improved.

Next, each configuration of the system 1 will be described in detail.

Configuration of Vehicle

Figure 2:
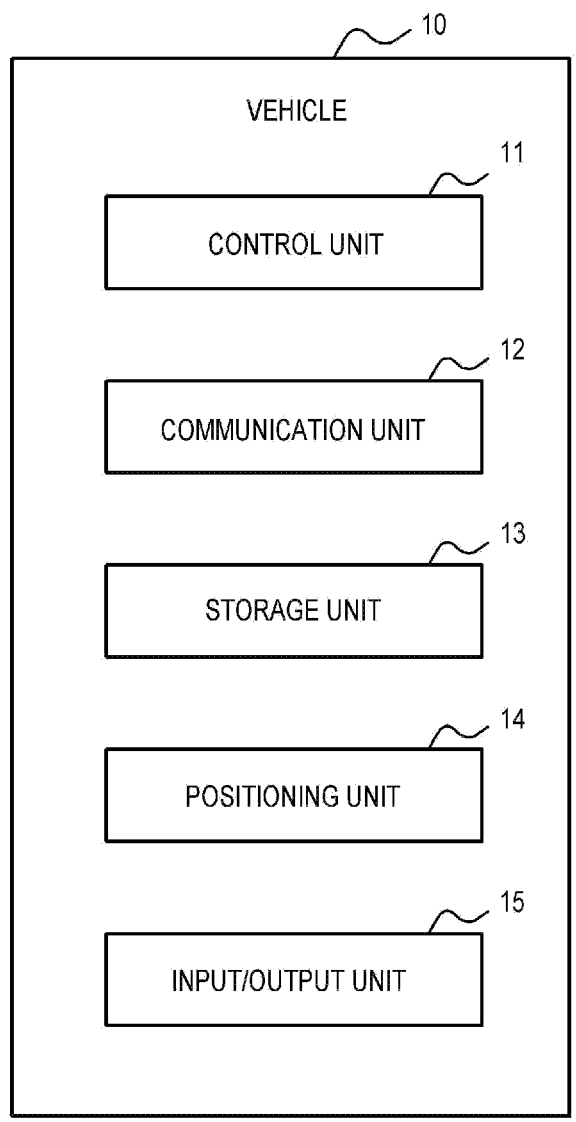
FIG. 2 is a block diagram illustrating a schematic configuration of a vehicle according to one embodiment of the present disclosure.

As illustrated in FIG. 2, the vehicle 10 includes a control unit 11, a communication unit 12, a storage unit 13, a positioning unit 14, and an input/output unit 15.

The control unit 11 includes one or more processors, one or more programmable circuits, one or more dedicated circuits, or a combination thereof. Examples of the processor include, but are not limited to, a general-purpose processor, such as a central processing unit (CPU) or a graphics processing unit (GPU), or a dedicated processor specialized for specific processing. Examples of the programmable circuit include, but are not limited to, a field-programmable gate array (FPGA). Examples of the dedicated circuit include, but are not limited to, an application-specific integrated circuit (ASIC). The control unit 11 controls an operation of the entire vehicle 10.

The communication unit 12 includes one or more communication interfaces connected to the network 30. The communication interface corresponds to, for example, a mobile communication standard, such as Fourth Generation (4G) or Fifth Generation (5G), but is not limited thereto. In the present embodiment, the vehicle 10 communicates with the information processing apparatus 20 via the communication unit 12 and the network 30.

The storage unit 13 includes one or more memories. Examples of the memory include, but are not limited to, a semiconductor memory, a magnetic memory, or an optical memory. Each memory included in the storage unit 13 may function as, for example, a primary storage device, an auxiliary storage device, or a cache memory. The storage unit 13 stores any information used for the operation of the vehicle 10. For example, the storage unit 13 may store a system program, an application program, and embedded software. The information stored in the storage unit 13 may be updatable with information acquired from the network 30 via, for example, the communication unit 12.

The positioning unit 14 includes one or more positioning modules. Examples of the positioning module include, but are not limited to, a positioning module corresponding to the Global Positioning System (GPS), the Quasi-Zenith Satellite System (QZSS), the Global Navigation Satellite System (GLONASS), or Galileo can be used. The positioning unit 14 acquires information indicating a position of the vehicle 10.

The input/output unit 15 includes one or more input interfaces. As the input interface, for example, a physical key, a capacitance key, a pointing device, a touch screen integrally provided with a display, or a microphone can be used. The input/output unit 15 receives an operation, such as an input of information from a user, used for an operation of the information processing apparatus 20. Further, the input/output unit 15 includes one or more output interfaces. As the output interface, for example, a panel display or a head-up display that outputs information as an image, a speaker that outputs information by voice, or the like can be used. The input/output unit 15 outputs information obtained by the operation of the information processing apparatus 20 to the user by screen display, voice, or the like.

Configuration of Information Processing Apparatus

Figure 3:
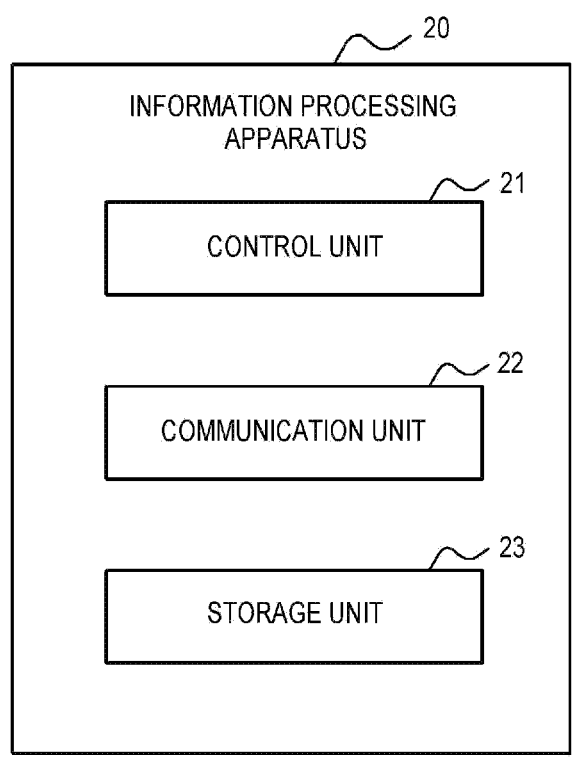
FIG. 3 is a block diagram illustrating a schematic configuration of an information processing apparatus according to one embodiment of the present disclosure.

As illustrated in FIG. 3, the information processing apparatus 20 includes the control unit 21, the communication unit 22, and the storage unit 23.

The control unit 21 includes one or more processors, one or more programmable circuits, one or more dedicated circuits, or a combination thereof. The control unit 21 controls an operation of the entire information processing apparatus 20.

The communication unit 22 includes one or more communication interfaces connected to the network 30. The communication interface corresponds to, for example, a mobile communication standard, a wired local area network (LAN) standard, or a wireless LAN standard, but the examples are not limited thereto and the communication interface may correspond to any communication standard. In the present embodiment, the information processing apparatus 20 communicates with the vehicle 10 via the communication unit 22 and the network 30.

The storage unit 23 includes one or more memories. The memory may function as, for example, a primary storage device, a second storage device, or a cache memory. The storage unit 23 stores any information used for the operation of the information processing apparatus 20. For example, the storage unit 23 may store a system program, an application program, a database, and map information. The information stored in the storage unit 23 may be updatable with information acquired from the network 30 via, for example, the communication unit 22.

Operation Flow of Information Processing Apparatus

Figure 4:
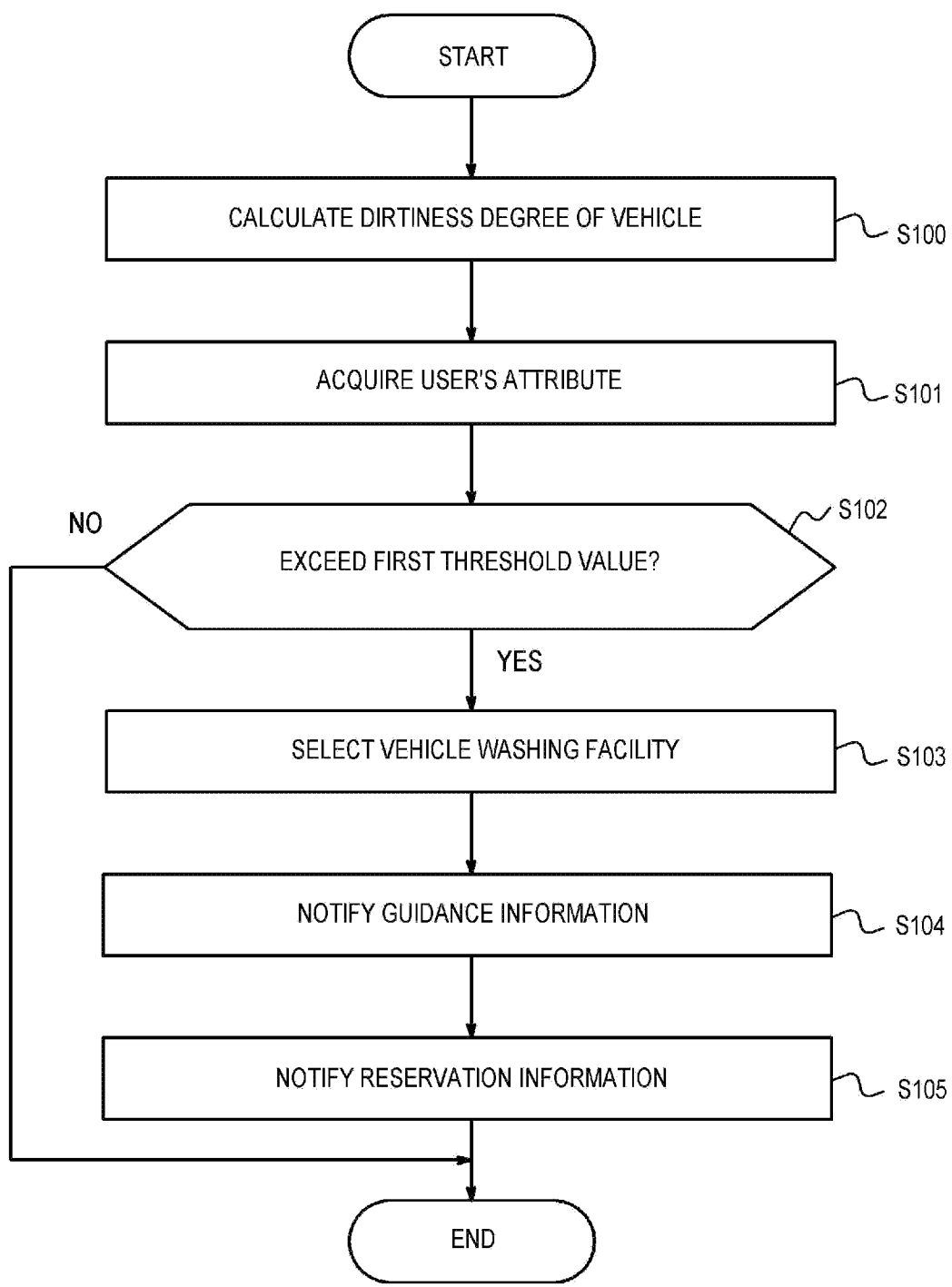
FIG. 4 is a flowchart illustrating an operation of the information processing apparatus according to one embodiment of the present disclosure.

An operation of the information processing apparatus 20 according to the embodiment of the present disclosure will be described with reference to FIG. 4. The operation corresponds to a method according to one embodiment of the present disclosure.

Step S100: The control unit 21 of the information processing apparatus 20 calculates the dirtiness degree of the vehicle 10.

Specifically, the control unit 21 of the information processing apparatus 20 acquires an image of the vehicle 10 captured by a camera and the like installed in a parking lot, an intersection, or the like via the communication unit 22. Then, the control unit 21 of the information processing apparatus 20 calculates the dirtiness degree of the vehicle 10 from the acquired image of the vehicle 10 using any image recognition technology. At this time, the control unit 21 of the information processing apparatus 20 also acquires identification information of the vehicle 10 including a registration number and the like written on a license plate. The dirtiness degree of the vehicle 10 may include, but is not limited to, the dirtiness degree of a vehicle body, vehicle wheels, vehicle windows, or the like. Further, the dirtiness degree of the vehicle 10 may be a continuous indicator, such as 0% to 100%, which is decided according to a size of an area to which dirt, such as mud, is attached, or a step-wise indicator, such as "high", "medium", or "low", but is not limited thereto.

Instead of the above, the control unit 21 of the information processing apparatus 20 may calculate the dirtiness degree of the vehicle 10 based on past weather information acquired from a server and the like to which weather information is provided via the communication unit 22, and past traveling information acquired from the vehicle 10 via the communication unit 22. For example, when the number of rainy days in an area in which the vehicle 10 has traveled in the past exceeds a predetermined number of days, the control unit 21 of the information processing apparatus 20 may calculate the dirtiness degree of the vehicle 10 to be "high". On the other hand, when the number of rainy days in the area in which the vehicle 10 has traveled in the past does not exceed the predetermined number of days, the control unit 21 of the information processing apparatus 20 may calculate the dirtiness degree of the vehicle 10 to be "low".

Step S101: The control unit 21 of the information processing apparatus 20 calculates information indicating the attribute of the user of the vehicle 10.

First, step S101 will be specifically described in a case where the user's attribute includes a preference of an individual. The control unit 21 of the information processing apparatus 20 specifies an individual, who is the user of the vehicle 10, based on the identification information of the vehicle 10 acquired in step S100. Then, the control unit 21 of the information processing apparatus 20 acquires information indicating a lifestyle of an individual from an application that enables creation of a household account book using the Internet or an application that enables a reservation for a restaurant or a lodging facility using the Internet. Then, the control unit 21 of the information processing apparatus 20 predicts the individual's preference based on the information indicating the lifestyle. Examples of the information indicating the lifestyle may include Engel's coefficient, which is calculated based on a total expenditure, food expenses, and the like per year or per month. In this case, when the Engel's coefficient does not exceed a predetermined threshold value, the control unit 21 of the information processing apparatus 20 may predict the individual's preference to be high-end-oriented. On the other hand, when the Engel's coefficient exceeds the predetermined threshold value, the control unit 21 of the information processing apparatus 20 may predict the individual's preference to be casual-oriented. Further, the information indicating the lifestyle may be, for example, the frequency of reservations or the number of reservations for a restaurant or a lodging facility of which a price range is equal to or higher than a certain level. In this case, when the frequency of reservations or the number of reservations for a restaurant or a lodging facility of which a price range is equal to or higher than a certain level exceeds a predetermined threshold value, the control unit 21 of the information processing apparatus 20 may predict the individual's preference to be high-end-oriented. On the other hand, when the frequency of reservations or the number of reservations for a restaurant or a lodging facility of which a price range is equal to or higher than a certain level does not exceed the predetermined threshold value, the control unit 21 of the information processing apparatus 20 may predict the individual's preference to be casual-oriented. When an application that enables creation of a household account book using the Internet is installed on a smartphone, a tablet, a personal computer (PC), or the like, the application provides services in which daily expenses are classified into items, such as food expenses and utility expenses, based on a use history of a credit card, a bank account, or the like. Further, when an application that enables a reservation for a restaurant or a lodging facility using the Internet is installed on a smartphone, a tablet, a PC, or the like, the application provides a service for making a reservation for a restaurant or a lodging facility online.

In addition to or instead of the above, the control unit 21 of the information processing apparatus 20 may predict the individual's preference based on information indicating a behavior history of the individual, which is stored in advance in the storage unit 23. More specifically, the control unit 21 of the information processing apparatus 20 may predict the individual's preference from information indicating a vehicle washing course selected in the past, which is stored in advance in the storage unit 23. For example, when the same vehicle washing course has been selected a predetermined number of times or more in the past, the control unit 21 of the information processing apparatus 20 may predict the individual's preference to be stability-oriented.

In addition to or instead of the above, the control unit 21 of the information processing apparatus 20 may predict the individual's preference based on traveling information of the vehicle 10, which is stored in advance in the storage unit 23. For example, when a vehicle washing facility 40 positioned along a main road has been selected a predetermined number of times or more in the past, the control unit 21 of the information processing apparatus 20 may predict that the individual's preference is focused on accessibility. Further, after the vehicle washing, when the vehicle 10 has visited a commercial facility and the like positioned in the vicinity of the vehicle washing facility 40 a predetermined number of times or more, the control unit 21 of the information processing apparatus 20 may predict that the individual's preference is focused on efficiency.

Next, step S101 will be specifically described in a case where the user's attribute includes a type of business of a business operator. The control unit 21 of the information processing apparatus 20 specifies the type of business of the business operator who owns the vehicle 10 from an image of the vehicle 10 acquired in the same manner as in step S100 using any image recognition technology. Examples of the type of business of the business operator include, but are not limited to, a taxi industry, a bus industry, a truck industry, or the like.

Step S102: The control unit 21 of the information processing apparatus 20 determines whether the dirtiness degree of the vehicle 10 exceeds the predetermined first threshold value. When the control unit 21 of the information processing apparatus 20 determines that the dirtiness degree of the vehicle 10 exceeds the predetermined first threshold value (step S102—Yes), the process proceeds to step S103. On the other hand, when the control unit 21 of the information processing apparatus 20 determines that the dirtiness degree of the vehicle 10 does not exceed the predetermined first threshold value (step S102-No), the process ends.

Here, the predetermined first threshold value may be determined in advance for each of a plurality of destinations. Specifically, the control unit 21 of the information processing apparatus 20 specifies a future destination of the user of the vehicle 10 from an application that enables the creation of a schedule using the Internet. Then, the control unit 21 of the information processing apparatus 20 determines the dirtiness degree of the vehicle 10 using the predetermined first threshold value corresponding to the specified future destination. Here, it is assumed that information indicating a destination a (for example, a wedding hall), a destination b (for example, a supermarket), and a destination c (for example, a campsite) is registered in advance in the storage unit 23 of the information processing apparatus 20. Further, it is assumed that the predetermined first threshold value corresponding to the destination a (the dirtiness degree: 5%), the predetermined first threshold value corresponding to the destination b (the dirtiness degree: 10%), and the predetermined first threshold value corresponding to the destination c (the dirtiness degree: 20%) are registered in advance in the storage unit 23 of the information processing apparatus 20. Further, it is assumed that the dirtiness degree (15%) of the vehicle 10 calculated in step S100 is registered in the storage unit 23 of the information processing apparatus 20. For example, when the control unit 21 of the information processing apparatus 20 specifies that the future destination of the user of the vehicle 10 is the destination a, the dirtiness degree (15%) of the vehicle 10 exceeds the predetermined first threshold value (the dirtiness degree: 5%) corresponding to the destination a, and thus the process proceeds to step S103. On the other hand, when the control unit 21 of the information processing apparatus 20 specifies that the future destination of the user of the vehicle 10 is the destination c, the dirtiness degree (15%) of the vehicle 10 does not exceed the predetermined first threshold value (the dirtiness degree: 20%) corresponding to the destination c, and thus the process ends. When an application that enables creation of a schedule using the Internet is installed on a smartphone, a tablet, a PC, and the like, it provides services for registering, managing, and the like a schedule of the user on the Internet, based on an input of the user.

Step S103: The control unit 21 of the information processing apparatus 20 selects at least one vehicle washing facility 40 based on the attribute of the user of the vehicle 10 from among a plurality of vehicle washing facilities 40.

First, step S103 will be specifically described in a case where the user's attribute includes the individual's preference. Here, it is assumed that information indicating a position of each vehicle washing facility 40, and information indicating the content and a vehicle washing fee of a vehicle washing course that can be selected at each vehicle washing facility 40 is stored in advance in the storage unit 23 of the information processing apparatus 20. Examples of the vehicle washing facility 40 include, but are not limited to, a vehicle washing facility that allows the vehicle washing by a vehicle washing machine or by hand. Further, the content of the vehicle washing course may include, but is not limited to, vehicle washing with water, vehicle washing with shampoo, vehicle washing with wax, vehicle washing with water-repellent coating, vehicle washing with glass coating, or the like. The content of the vehicle washing course may also include vehicle washing with blushing using a washing blush and vehicle washing with a jet using a high-pressure spray. Hereinbelow, to simplify the description, it is assumed that information indicating vehicle washing courses A to E and information indicating a vehicle washing facility 40 that can provide at least one vehicle washing course selected from the vehicle washing courses A to E are registered in advance in the storage unit 23 of the information processing apparatus 20. Further, it is assumed that the vehicle washing fee is the cheapest in the vehicle washing course A, and gets higher in the order of the vehicle washing course A, the vehicle washing course B, the vehicle washing course C, the vehicle washing course D, and the vehicle washing course E. For example, in step S101, upon predicting the individual's preference to be high-end-oriented, the control unit 21 of the information processing apparatus 20 selects the vehicle washing facility 40 that can provide the vehicle washing course E having the highest vehicle washing fee. Further, for example, in step S101, upon predicting the individual's preference to be casual-oriented, the control unit 21 of the information processing apparatus 20 selects the vehicle washing facility 40 that can provide the vehicle washing course C having a reasonable vehicle washing fee. Further, for example, in step S101, upon predicting the individual's preference to be stability-oriented, the control unit 21 of the information processing apparatus 20 selects the vehicle washing facility 40 that can provide a vehicle washing course that has been selected a predetermined number of times or more in the past. Further, for example, in step S101, upon predicting that the individual's preference is focused on accessibility, the control unit 21 of the information processing apparatus 20 selects a vehicle washing facility 40 that can be reached from a current position of the vehicle 10 through a main road. Further, for example, in step S101, upon predicting that the individual's preference is focused on efficiency, the control unit 21 of the information processing apparatus 20 selects a vehicle washing facility 40 in the vicinity of which a commercial facility and the like are positioned.

Next, step S103 will be specifically described in a case where the user's attribute includes a type of business of a business operator. Here, it is assumed that the information indicating the position of each vehicle washing facility 40 and the information indicating types of vehicles (large vehicles, standard vehicles, and the like) that can be washed at each vehicle washing facility 40 are registered in advance in the storage unit 23 of the information processing apparatus 20. For example, when the business type of the business operator who owns the vehicle 10 specified in step S101 is the taxi business, the control unit 21 of the information processing apparatus 20 selects a vehicle washing facility 40 at which a vehicle washing machine for standard vehicles is installed from among the plurality of vehicle washing facilities 40. Further, for example, when the business type of the business operator who owns the vehicle 10 specified in step S101 is the bus business or the truck business, the control unit 21 of the information processing apparatus 20 selects a vehicle washing facility 40 at which a vehicle washing machine for large vehicles is installed from among the plurality of vehicle washing facilities 40.

In addition to or instead of the above, the control unit 21 of the information processing apparatus 20 may select a vehicle washing facility 40 that can correspond to the dirtiness degree of the vehicle 10 calculated in step S100, and can provide a vehicle washing course in which the vehicle washing is ended by an end time desired by the business operator that owns the vehicle 10 from among a plurality of vehicle washing courses. Here, it is assumed that the information indicating the vehicle washing courses A to C is registered in advance in the storage unit 23 of the information processing apparatus 20. It is assumed that the vehicle washing course A can correspond to the dirtiness degree of "high" and washes a vehicle for 20 minutes. It is assumed that the vehicle washing course B can correspond to the dirtiness degree of "medium" and washes a vehicle for 10 minutes. It is assumed that the vehicle washing course C can correspond to the dirtiness degree of "low" and washes a vehicle for 5 minutes. First, the control unit 21 of the information processing apparatus 20 acquires an end time of the vehicle washing desired by the business operator who owns the vehicle 10 from a server, a terminal, the vehicle 10, or the like that are owned by the business operator, via the communication unit 22. Here, it is assumed that the dirtiness degree of the vehicle 10 calculated in step S100 is "high", the current time is 10:00, a desired end time is 10:15, and a permitted level of the dirtiness degree of the vehicle 10 after washing is "medium" or lower. In this case, although the vehicle washing course A can correspond to the dirtiness degree of "high", the vehicle washing is not ended by the desired end time (10:15) because the vehicle washing course A washes a vehicle for 20 minutes. In other words, there is no vehicle washing facility 40 that can correspond to the dirtiness degree of the vehicle 10 and can provide a vehicle washing course in which the vehicle washing is ended by the desired end time. However, since the vehicle washing course B can correspond to the dirtiness degree of "medium", it cannot completely remove the dirt of the vehicle 10 having the dirtiness degree of "high" but can reduce the dirt of the vehicle 10 to the permitted level. In addition, since the time required for the vehicle washing is 10 minutes, the vehicle washing course B ends the vehicle washing by the desired end time (10:15). Then, the control unit 21 of the information processing apparatus 20 selects a vehicle washing facility 40 that can provide the vehicle washing course B in which the dirtiness of the vehicle 10 can be reduced to the predetermined permitted level and the vehicle washing is ended by the desired end time from among the plurality of vehicle washing courses.

In step S103, the control unit 21 of the information processing apparatus 20 may select, from among the plurality of vehicle washing facilities 40, at least one vehicle washing facility 40 based on congestion degrees at the plurality of vehicle washing facilities 40. Specifically, the control unit 21 of the information processing apparatus 20 acquires the congestion degrees from the plurality of vehicle washing facilities 40 via the communication unit 22. Then, the control unit 21 of the information processing apparatus 20 selects a vehicle washing facility 40 at which the acquired congestion degree does not exceed a predetermined threshold value. As such, operating rates of the plurality of vehicle washing facilities 40 are averaged. The congestion degree may be a continuous indicator, such as 0% to 100%, which is appropriately decided based on the number of vehicles 10 using the vehicle washing facility 40 and the like, or a step-wise indicator, such as "high", "medium", or "low", but is not limited thereto.

Step S104: The control unit 21 of the information processing apparatus 20 notifies, via the communication unit 22, the user of the vehicle 10 of the guidance information for guiding the user of the vehicle 10 to the vehicle washing facility 40 selected in step S103.

Specifically, the control unit 21 of the information processing apparatus 20 acquires, via the communication unit 22, information indicating the current position of the vehicle 10, which is positioned by the positioning unit 14 of the vehicle 10. Then, the control unit 21 of the information processing apparatus 20 specifies, on a map, a route from the acquired information indicating the current position of the vehicle 10 to the vehicle washing facility 40 selected in step S103. Then, the control unit 21 of the information processing apparatus 20 generates the guidance information including information indicating the specified route. In addition to the information indicating the specified route, the guidance information may include the content of the vehicle washing course selected using the above-described method, the vehicle washing fee, the information indicating the vehicle washing time, and the like. Then, the control unit 21 of the information processing apparatus 20 transmits, via the communication unit 22, the generated guidance information to the vehicle 10. Then, the control unit 11 of the vehicle 10 outputs the guidance information received from the information processing apparatus 20 via the communication unit 12 to the user of the vehicle 10 via the input/output unit 15 by screen display, voice, or the like. In addition to or instead of the above, the control unit 21 of the information processing apparatus 20 may transmit the above-described guidance information to any terminal owned by the user of the vehicle 10 via the communication unit 22, and output the guidance information on the terminal to the user of the vehicle 10.

In addition to the above, in step S104, the control unit 21 of the information processing apparatus 20 may execute machine learning on a timing of notifying the guidance information, as described below. In other words, the control unit 21 of the information processing apparatus 20 may determine the timing of notifying the guidance information using a machine learning model. Specifically, the control unit 21 of the information processing apparatus 20 acquires, from the storage unit 23, the time of execution of going-outside in which the vehicle 10 moves the distance that exceeds the predetermined second threshold value and the time of execution of the vehicle washing within the predetermined period before and after the time of the execution of the going-outside. Further, the control unit 21 of the information processing apparatus 20 acquires a time of execution of a future going-outside in which the vehicle 10 moves a distance that exceeds the predetermined second threshold value from the application that enables the creation of the schedule using the Internet. Then, the control unit 21 of the information processing apparatus 20 executes the machine learning on whether to notify the above-described guidance information before or after the time of the execution of the future going-outside in which the vehicle 10 moves the distance that exceeds the predetermined second threshold value, based on a before-after relationship between the time of the execution of the going-outside in which the vehicle 10 moves the distance that exceeds the predetermined second threshold value and the time of the execution of the vehicle washing within the predetermined period before and after the time of the execution of the going-outside. As such, when the user goes out, the control unit 21 of the information processing apparatus 20 can notify the user of the above-described guidance information at an appropriate timing in terms of whether to wash the vehicle before or after the going-outside, according to the user's preference. The time of the execution of the going-outside may mean a time at which the vehicle 10 starts moving toward a destination related to the going-outside, but is not limited thereto. Further, examples of the predetermined second threshold value include, but are not limited to, several tens of kilometers or several hundreds of kilometers. Further, examples of the predetermined period before and after the time of the execution of the going-outside include but are not limited to, several hours or several days. Further, examples of the machine learning include, but are not limited to, any machine learning using, a support vector machine, a neural network, or the like.

Step S105: The control unit 21 of the information processing apparatus 20 notifies the vehicle washing facility 40 via the communication unit 22 of reservation information for reserving the vehicle washing facility 40, which is selected based on the input from the user of the vehicle 10.

Specifically, the control unit 21 of the information processing apparatus 20 acquires, via the communication unit 22, information indicating the vehicle washing facility 40 selected by the user of the vehicle 10 who has received the guidance information in step S104 via the input/output unit 15 of the vehicle 10, a terminal, or the like. Then, the control unit 21 of the information processing apparatus 20 generates the reservation information for making a reservation for the vehicle washing facility 40 selected by the user of the vehicle 10. Then, the control unit 21 of the information processing apparatus 20 transmits, via the communication unit 22, the generated reservation information to the vehicle washing facility 40. As such, a reservation for the vehicle washing facility 40 is made. The reservation information may include, but is not limited to, identification information of the vehicle 10 including the registration number and the like written on a license plate, and a reaching time calculated from the current position of the vehicle 10 and the position of the vehicle washing facility 40.

As described above, upon determining that the dirtiness degree of the vehicle 10 exceeds the predetermined first threshold value, the control unit 21 of the information processing apparatus 20 according to the present disclosure selects at least one vehicle washing facility 40 based on an attribute of the user of the vehicle 10 from among the plurality of vehicle washing facilities 40. Then, the control unit 21 of the information processing apparatus 20 notifies, via the communication unit 22, the user of the vehicle 10 of guidance information for guiding the user of the vehicle 10 to the selected vehicle washing facility 40.

With such a configuration, the guidance information to the vehicle washing facility 40, which is selected based on the attribute of the user of the vehicle 10, is notified to the user of the vehicle 10. For example, the guidance information to the vehicle washing facility 40, which is selected based on the preference of the user of the vehicle 10, is notified to the user of the vehicle 10 at an appropriate timing. For this reason, the user of the vehicle 10 can keep the vehicle 10 in a clean state without executing unnecessary vehicle washing. Therefore, the technology for proposing vehicle washing is improved.

Although the present disclosure has been described based on the drawings and the examples, it should be noted that many modifications and changes may be made by those skilled in the art based on the present disclosure. It is therefore to be noted that the modifications and changes thereof fall within the scope of the present disclosure. For example, functions, and the like, included in each element, each step, or the like, can be rearranged so as not to be logically contradictory, and a plurality of elements, steps, or the like, may be combined into one or divided.

As a modified example, an embodiment in which the configuration and the operation of the information processing apparatus 20 are distributed to a plurality of computers capable of communicating with each other is possible. Further, for example, an embodiment in which a part or all of the components of the information processing apparatus 20 are provided in the vehicle 10 is also possible. For example, a navigation device mounted on the vehicle 10 may include a part or all of the components of the information processing apparatus 20.

Further, as a modified example, in the above-described step S103, the control unit 21 of the information processing apparatus 20 may select, from among the plurality of vehicle washing facilities 40, at least one vehicle washing facility 40 based on a type of coating agent applied to the vehicle 10 and a type of vehicle washing brush provided at the vehicle washing facility 40. Specifically, information indicating the type of vehicle washing brush provided in each vehicle washing facility 40 and information indicating the type of coating agent compatible with each vehicle washing brush are stored in advance in the storage unit 23 of the information processing apparatus 20. Further, the information indicating the type of the coating agent applied to the vehicle 10 at a timing of a vehicle inspection and the like and the identification information of the vehicle 10 are stored in advance in the storage unit 23 of the information processing apparatus 20. Then, the control unit 21 of the information processing apparatus 20 specifies the type of the coating agent applied to the vehicle 10 with reference to the storage unit 23. Then, the control unit 21 of the information processing apparatus 20 selects a vehicle washing facility 40 in which a vehicle washing brush compatible with the specified coating agent is provided.

Further, as a modified example, for example, an embodiment in which a general-purpose computer functions as the information processing apparatus 20 according to the above-described embodiment is also possible. Specifically, a program describing processing content that implements each function of the information processing apparatus 20 according to the above-described embodiment is stored in a memory of a general-purpose computer, and the program is read and executed by a processor. Therefore, the disclosure according to the present embodiment can also be implemented as a program that can be executed by a processor or a non-transitory computer-readable medium storing the program.

What is claimed is:

1. An information processing apparatus comprising:
a communication interface; and
one or more processors configured to
when determining that a degree of dirt of a vehicle exceeds a predetermined first threshold value, select at least one vehicle washing facility from among a plurality of vehicle washing facilities, based on an attribute of a user of the vehicle, and
notify the user of guidance information for guiding the user to the selected vehicle washing facility via the communication interface, wherein:
the predetermined first threshold value is determined in advance for each of a plurality of destinations; and
the one or more processors are configured to
specify a future destination of the user from an application that enables creation of a schedule using the Internet, and
determine the degree of the dirt of the vehicle using the predetermined first threshold value corresponding to the specified future destination;
wherein the plurality of vehicle washing facilities offer a plurality of vehicle washing courses,
a vehicle washing time of each of the vehicle washing courses and a degree of dirt that each of the vehicle washing courses is able to deal with are determined in advance, and the one or more processors are configured to:
acquire an end time of vehicle washing desired by the user;
select the vehicle washing facility that is able to provide a vehicle washing course that is able to deal with the dirt of the vehicle and that ends vehicle washing by the end time, from among the vehicle washing courses; and
execute machine learning on whether to notify the guidance information before or after a time of execution of a future going-outside in which the vehicle moves a distance that exceeds a predetermined second threshold value, based on a before-after relationship between a time of execution of a going-outside in which the vehicle moves a distance that exceeds the predetermined second threshold value and a time of execution of vehicle washing within a predetermined period before and after the time of the execution of the going-outside.

2. The information processing apparatus according to claim 1, wherein the attribute of the user includes a preference of the user.

3. The information processing apparatus according to claim 2, wherein the one or more processors are configured to:
acquire information indicating a lifestyle of the user from an application that enables creation of a household account book using Internet or an application that enables a reservation for a restaurant or a lodging facility using the Internet; and
predict the preference of the user based on the acquired information indicating the lifestyle.

4. The information processing apparatus according to claim 1, wherein the one or more processors are configured to, when no vehicle washing facility is able to provide the vehicle washing course that is able to deal with the dirt of the vehicle and that ends the vehicle washing by the end time, select a vehicle washing facility that is able to provide a vehicle washing course that enables the degree of the dirt of the vehicle to be reduced to a predetermined permitted level and that ends the vehicle washing by the end time, from among the plurality of vehicle washing courses.

5. A method executed by an information processing apparatus, the method comprising:
when determining that a degree of dirt of a vehicle exceeds a predetermined first threshold value, selecting at least one vehicle washing facility from among a plurality of vehicle washing facilities, based on an attribute of a user of the vehicle; and
notifying the user of guidance information for guiding the user to the selected vehicle washing facility;
wherein:
the predetermined first threshold value is determined in advance for each of a plurality of destinations; and
the method further comprises
specifying a future destination of the user from an application that enables creation of a schedule using Internet, and
determining the degree of the dirt of the vehicle using a predetermined first threshold value corresponding to the specified future destination;
wherein the plurality of vehicle washing facilities offer a plurality of vehicle washing courses,
a vehicle washing time of each of the vehicle washing courses and a degree of dirt that each of the vehicle washing courses is able to deal with are determined in advance, and the method further comprising:
acquiring an end time of vehicle washing desired by the user;
selecting the vehicle washing facility that is able to provide a vehicle washing course that is able to deal with the dirt of the vehicle and that ends vehicle washing by the end time, from among the vehicle washing courses; and
executing machine learning on whether to notify the guidance information before or after a time of execution of a future going-outside in which the vehicle moves a distance that exceeds a predetermined second threshold value, based on a before-after relationship between a time of execution of a going-outside in which the vehicle moves a distance that exceeds the predetermined second threshold value and a time of execution of vehicle washing within a predetermined period before and after the time of the execution of the going-outside.

6. The method according to claim 5, wherein the attribute of the user includes a preference of the user.

7. The method according to claim 6, further comprising:
acquiring information indicating a lifestyle of the user from an application that enables creation of a household account book using Internet or an application that enables a reservation for a restaurant or a lodging facility using the Internet; and
predicting the preference of the user based on the acquired information indicating the lifestyle.

8. The method according to claim 5, further comprising:
selecting, when no vehicle washing facility is able to provide a vehicle washing course that is able to deal with the dirt of the vehicle and that ends the vehicle washing by the end time, a vehicle washing facility that is able to provide a vehicle washing course that enables the degree of the dirt of the vehicle to be reduced to a predetermined permitted level and that ends the vehicle washing by the end time, from among the plurality of vehicle washing courses.

9. A non-transitory storage medium storing instructions that are executable by one or more processors and that cause the one or more processors to perform functions, the functions comprising:
when determining that a degree of dirt of a vehicle exceeds a predetermined first threshold value, selecting at least one vehicle washing facility from among a plurality of vehicle washing facilities, based on an attribute of a user of the vehicle; and
notifying the user of guidance information for guiding the user to the selected vehicle washing facility;
wherein:
the predetermined first threshold value is determined in advance for each of a plurality of destinations, and
the functions further comprise:
specifying a future destination of the user from an application that enables creation of a schedule using Internet; and
determining the degree of the dirt of the vehicle using the predetermined first threshold value corresponding to the specified future destination;
wherein the plurality of vehicle washing facilities offer a plurality of vehicle washing courses,
a vehicle washing time of each of the vehicle washing courses and a degree of dirt that each of the vehicle washing courses is able to deal with are determined in advance, and the functions further comprise:
acquiring an end time of vehicle washing desired by the user;
selecting the vehicle washing facility that is able to provide a vehicle washing course that is able to deal with the dirt of the vehicle and that ends vehicle washing by the end time, from among the vehicle washing courses; and
executing machine learning on whether to notify the guidance information before or after a time of execution of a future going-outside in which the vehicle moves a distance that exceeds a predetermined second threshold value, based on a before-after relationship between a time of execution of a going-outside in which the vehicle moves a distance that exceeds the predetermined second threshold value and a time of execution of vehicle washing within a predetermined period before and after the time of the execution of the going-outside.

10. The non-transitory storage medium, according to claim 9, wherein the attribute of the user includes a preference of the user.

11. The non-transitory storage medium according to claim 10, wherein the functions further comprise:
acquiring information indicating a lifestyle of the user from an application that enables creation of a household account book using Internet or an application that enables a reservation for a restaurant or a lodging facility using the Internet; and
predicting the preference of the user based on the acquired information indicating the lifestyle.

* * * * *